United States Patent Office 3,454,532
Patented July 8, 1969

3,454,532
PROCESS FOR PREPARING POLYESTERS FROM DIALKYL-2,6-NAPHTHALENE DICARBOXYLIC ACID AND A DIOL
Gary Lee Driscoll, Boothwyn, Pa., assignor to Sun Oil Company, Philadelphia, Pa., a corporation of New Jersey
No Drawing. Filed Oct. 5, 1967, Ser. No. 672,965
Int. Cl. C08g 17/03, 1/00
U.S. Cl. 260—75                                      6 Claims

ABSTRACT OF THE DISCLOSURE

The polymerization rate of dimethyl-2,6-naphthalene dicarboxylate and a diol is improved by adding to the polymerization mixture of small amount of either the dialdehyde, the aldester or mixtures thereof of 2,6-dimethyl naphthalene. The amount added is .005–2.5 weight percent of the dialdehyde, twice as much of the aldester or a proportionate amount of a mixture of the two. The net result is that the reaction times to produce a paricular molecular weight polyester are reduced or stated differently higher molecular weight polyesters can be obtained in the reaction times previously used.

BACKGROUND IF THE INVENTION

Polyesters prepared from specific dicarboxylic acids and diols are well known in the art. Recently increased interest has been directed towards one of the newer polyesters. This is one derived from naphthalene-2,6-dicarboxylic acid and suitable diols.

These polyesters are of interest because of their high glass transition temperatures. This property is of value in the production of permanent press type of garments. Unfortunately naphthalene-2,6-dicarboxylic acid and the dialkyl esters thereof are difficult to polymerize to desirable ranges of molecular weight at which they can be commercially employed.

It has been found that by employing the present invention it is possible to produce crystalline polyesters from dimethyl-2,6-naphthalene dicarboxylate and diols having the same molecular weight as polyesters prepared according to the prior art, but using shorter reaction times. Or stated otherwise, it is possible to obtain polyesters of greater molecular weight in the same reaction times of the prior art by the practice of the invention. Either utility is of commercial significance.

SUMMARY OF THE INVENTION

The present invention relates to an improvement in the process of preparing 2,6-naphthylene dicarboxylate polyesters.

Briefly stated the invention concerns an improvement in the process of preparing polyesters from naphthalene-2,6-dicarboxylic acid or lower dialkyl esters thereof and a diol wherein the improvement comprises adding to the reaction mixture a compound containing formyl groups and selected from the group consisting of 2,6-diformyl naphthalene, 2-formyl-6-alkyl naphthalene carboxylate and mixtures thereof, provided said compound is added in an amount that contains the number of formyl groups equivalent to that contained in the range of 0.005–2.5 weight percent of 2,6-diformyl naphthalene.

DESCRIPTION OF THE INVENTION

As stated above the invention lies in the introduction of the "dialdehyde" (2,6-diformyl naphthalene), "aldester" (2-formyl-6 alkyl-naphthalene carboxylate) or mixtures thereof into the polymerization reaction of naphthalene-2,6-dicarboxylic acid or dialkyl esters thereof and a diol.

The naphthalene-2,6-dicarboxylic acid can be prepared by a number of known methods two of which are shown in U.S. Patents 2,833,816 to Saffer et al. and 3,268,294 to Roberts et al. The dialkyl esters are produced by essentially conventional methods from the diacids. By lower esters it is meant that the acids are condensed with monohydric alcohols having 1 to 6 carbon atoms, for example, methanol, ethanol, butanol and the like.

The 2-formyl-6-naphthoic acid and 2,6-diformyl naphthalene are both products of the oxidation of 2,6-dimethyl naphthalene in the production of the diacid. The aldacid is present in relatively larger quantities, as shown in U.S. Patent 3,277,154 and commonly assigned copending application Ser. No. 576,241 filed Aug. 31, 1966. Both of these processes teach the preparation and separation of the adlester of 2,6-dimethyl naphthalene. The dialdehyde is present as a by-product of both processes, its recovery is merely a routine separation for those experienced in the art, however, an example of such a separation will be given below.

The presence of the aldester and/or the dialdehyde in the polymerization process had been thought to be detrimental as would the presence of impurities generally. Surprisingly the addition of the aldester, dialdehyde or mixtures thereof to the polymerization did not interfere with the reaction, but instead resulted in a polyester of higher molecular weight under the same reaction conditions than without the aldester and dialdehyde.

By way of a non-limiting explanation the following mechanism is offered to account for the surprising result. It is believed that the aldehyde groups react with the diol to form new trifunctional (III) or tetrafunctional (IV) monomers which then polymerized in the usual manner.

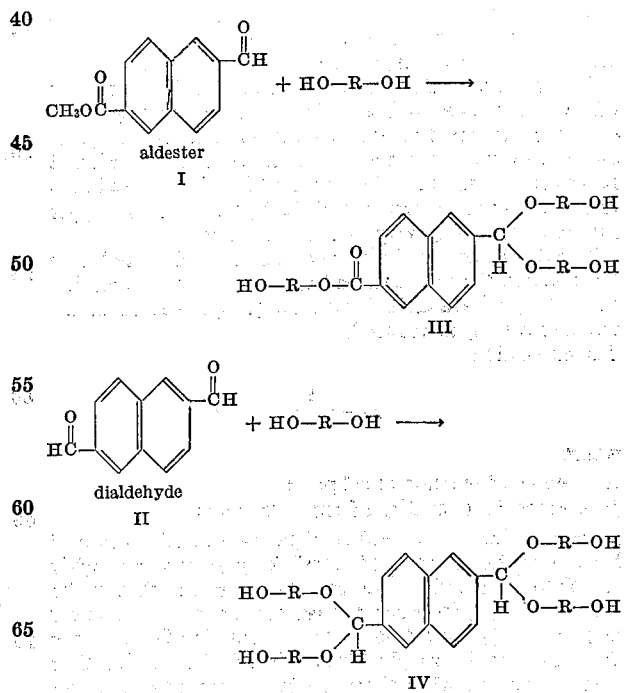

where R is a bivalent aliphatic, cyclic or aromatic radical.

These new intermediate monomers are considered to be of a transitory nature and in fact may exist in the forms:

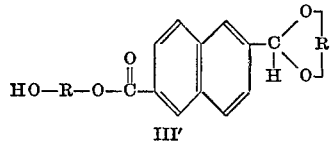

and

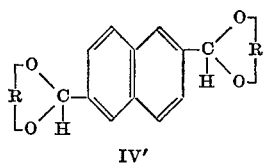

The radical

is known and is considered to be a blocking structure which may effectively prevent further reaction. If the intermediate form is according to III' and IV' then unexpectedly it reacts as if it were the III and IV form.

The amount of aldester present is in the range of .01 to 5 wt. percent and the dialdehyde is in the range of .005 to 2.5 wt. percent. These ranges are based on the total carbonyl compounds present, i.e., aldester, dialdehyde, diacid and diester.

It is readily apparent that the range for the aldester is twice that of the dialdehyde because the aldester has only one-half as many formyl groups as dialdehyde. When a mixture of dialdehyde and aldester is employed the proportions of each must be adjusted so as to remain within the ranges imposed for the individual monomers. These ranges are not critical in the sense of operability. The polymerization will take place with considerably larger quantities of the aldester and dialdehyde present, but the nature of the polymer is such that it is no longer a thermoplastic linear polyester. With larger amounts of the dialdehyde and aldester present there is a substantial degree of crosslinking which is undesirable for the polyesters in two ways. First the crystallinity of the polymer is decreased and secondly the solubility of the polymer in conventional solvents is reduced. These undesirable effects increase directly with the increase in aldester and dialdehyde.

The ranges given above do include polymerizations wherein there is a noticeable degree of crosslinking, however, the detriment is not so great as to make the polyesters unsuitable for their normal uses. The preferred ranges are .01 to about 2 wt. percent for aldester and .005 to about 1 wt. percent for dialdehyde. At these upper ranges there is only very light crosslinking.

The degree of crosslinking can be reduced by reducing the reaction time so that the degree of reaction, i.e., that percentage of available functional groups reacted in the polymerization, is reduced.

The expression:

$$p_c = \frac{1}{f-1}$$

where $p_c$ = degree of reaction at gel point
$f$ = average functionality of the monomers represents the limit on either of the two variables $p_c$ or $f$ because of the initiation of crosslinking. $p_c$ can be roughly correlated to reaction time and it can be seen that as the functionality, $f$, increases the gel point occurs at a lower degree of polymerization. A further limiting factor is the desired molecular weight. Thus although the reaction time may be reduced when there is a large amount of aldester or dialdehyde present, the resulting polyester although uncrosslinked may have a molecular weight which makes the polyester unfit for use. Inherent viscosity ($\eta$inh) is a function of the molecular weight of a polymer and is used herein as a measure of molecular weight. This situation can be ideally represented by the expression:

$$(\bar{X}_n)_{gel} = \frac{1}{1-\left(\frac{fp_c}{2}\right)}$$

where $(\bar{X}_n)_{gel}$ = number average degree of polymerization at gelation
$\bar{M}_n = \bar{X}_n \cdot$ molecular weight of monomer unit = number average molecular weight.

Thus it can be sen that by selecting any two of the variables the third variable to prevent crosslinking can be selected for a particular polymerization. According to proposed mechanism for the reaction $f$ can be represented by the equation:

$$f = 2(1-x) + 3(x) \text{ for aldester}$$

and $$f = 2(1-x') + 4(x') \text{ for dialdehyde}$$

where $x$ = mole fraction of aldester
$x'$ = mole fraction of dialdehyde
$(1-x) = (1-x')$ = mole fraction of diester or diacid.

Thus having selected $(\bar{X}_n)_{gel}$ and $p_c$ and calculated $f$ it is now possible to determine the moles of aldester or dialdehyde to be added to the polymerization reaction.

The following model is presented to show the utilization of the equations by one experienced in the polymerization art to benefit from the present invention. The reactants are dimethyl-2,6-naphthalene dicarboxylate and ethylene glycol. The desired number average molecular weight of the polyester is 60,000 and the degree of reaction at gel point $p_c$ is 97%. The number average degree of polymerization $$(\bar{X}_n)_{gel} \text{ is } \frac{60,000}{242 \text{ (molecular wt. of monomer unit)}} = 250$$

The equation $$(\bar{X}_n)_{gel} = \frac{1}{1-\left(\frac{fpc}{2}\right)}$$

is rearranged to $$f = \frac{2 - \left[\frac{2}{(\bar{X}_n)_{gel}}\right]}{p_c} = 2.03$$

assume the aldester (methyl) is to be added then $$2.03 = 2(1-x) + 3(x)$$

$$x = .03$$

Thus the carbonyl functionality of the reactants is made up to 3 mole percent of the aldester which is 2.6 wt. percent based on the total carbonyl compounds, i.e., diester and aldester and the diester makes up the balance, i.e., 97 mole percent.

The degree of reaction at ($p$) can be determined by titration of either the hydroxyl or carbonyl functions.

Also continual monitoring of the reaction by measurement of inherent viscosity can be used to determine p.

The ester portion of the aldester is prepared in the same manner as the diester using a lower monohydric alcohol as defined above, i.e., having 1–6 carbon atoms. Preferably the ester portion of the aldester will be the same as that of the diester since by this expedient is easier to remove and collect the regenerated alcohol from the polymerization.

The diol employed can be any of those previously used in the art. A preferred class of diols are those having 2 to 8 carbon atoms and include aliphatic, cyclic and aromatic radicals, for example, ethanediol; 1,3-propanediol; 1,2-propanediol; 1,4-butanediol; 1,4-cyclohexanedimethanol; 1,4-benzenediol and the like. Aliphatic diols are widely used in the preparation of polyesters and are a more preferred class.

The addition of the aldester, dialdehyde or mixtures thereof to a polymerization of 2,6-naphthalene dicarboxylic acid or dialkyl esters thereof and a diol will yield the improvement as defined above. This applies to any of the methods of polyesterification known and suitable for these reactants. This includes both solvent and melt transesterifications, direct polyesterifications of the diacid, emulsion processes and the like.

The reactions can be carried out with or without a suitable condensation catalyst, although a catalyst is preferred.

Generally solution processes are carried on at the solvent boiling point, i.e., the range of 80–285° C. a common solvent in benzene. In the case of some solvent polymerizations pressure must be used to avoid excessive loss of the solvent.

A preferred procedure for the polymerization has been a melt transesterification from which a low molecular weight polymer was recovered followed by a solid state polymerization of the low molecular weight polymer to produce polyesters of a suitable molecular weight. In this procedure the reactants are placed in a suitable reaction vessel. The reaction vessel can be any suitable material such as glass, stainless steel or any of the other materials commonly employed in processing polyester resins. A catalyst condensing agent was added to the reaction mass. The reaction mixture is then heated at a temperature in the range of 150 to 225° C., preferably 175–200° C. at atmospheric pressure in a nitrogen atmosphere for a period of time in the range of 2–6 hours or until the theoretical amount of alcohol has been recovered. During this time the lower alkyl alcohol will be distilled from the reaction mixture. Polymerization is initiated by slowly raising the temperature to between 200–400° C., preferably 230–290° C. over a period of time of 0.5–2.0 hours and at the same time slowly reducing the pressure on the system to less than 5 mm. Hg. During the continuance of the polymerization at the temperature for an additional 0.5 to 3.0 hours any unreacted excess diol is distilled from the reaction mixture. The polymer is cooled and ground to pass through a 20 mesh filter. The 20 mesh polymer is then placed in a polymerization tube under reduced pressure (less than 5 mm. Hg) and the temperature slowly raised to between 200–400° C. but not high enough to melt the polymer over a period of .5–2 hours. The temperature is maintained from .5 to 6 hours. During this time the polymer is jarred occasionally. After this time the temperature is raised to 285° C. as quickly as possible to melt the polymer. The temperature is maintained at that point for .25–1 hours then the polymer is cooled rapidly to room temperature and the polyester recovered.

However, the transesterification can be run as a single stage with the only difference being that the resulting polyester is somewhat lower molecular weight than that of the two stage polymerization.

The catalysts that can be used are well known and include the alkali metals, the alkaline earth metals; the oxides, carbonates, and borates of these two groups of metals; the one to six carbon alkoxides of these two groups of metals, magnesium, zinc and manganese; the oxides of these metals; cadmium, aluminum and copper; litharage or a combination of litharage with antimony trioxide or pentoxide and triphenyl phosphite and others. Generally 0.01 to 0.05% of these agents can be advantageously used.

Example 1.—Oxidation 125 g. of 2,6-dimethylnaphthalene, 62.5 g. of cobaltous acetate tetrahydrate, 6.25 g. of ammonium bromide, and 1250 ml. of glacial acetic acid are charged to a 3-liter, 3-necked, Morton flask fitted with a high-speed stirrer. The mixture is heated to 100°–110° C. The stirrer is set at high speed and oxygen is admitted to the bottom of the flask through a ¼″ I.D. gas delivery tube at a rate of 2 liters per minute. In the initial stage of the oxidation, the reaction is quite exothermic, and it is important to admit as much oxygen as necessary to prevent the formation of a vacuum in the flask. Thereafter, oxygen rate of 2 liters per minute and a temperature of about 110° C. is maintained for 3 hours. The reaction is stopped, and the contents of the flask are poured into 10 liters of distilled water. The slurry is allowed to cool and is filtered. The solids are washed well with distilled water to eliminate acetic acid and dried. Experience has shown that these solids consist of 40% 2,6-naphthalene dicarboxylic acid, 30% 2,6-aldacid and 30% others.

Isolation and purification

After drying, the solids were esterified at 150° C. with methyl alcohol and sulfuric acid catalyst. The entire esterification product is contacted with 4 to 5 times its volume of distilled water, filtered, washed and dried. 50 g. of the resulting solids are dissolved in four liters of boiling methanol, treated with 5 g. of decolorizing carbon and filtered into a large beaker. The methanol filtrate is kept at about 60° C. and 500 mls. of a 40% aqueous sodium bisulfite solution is added with stirring. A precipitate forms immediately. The solution is kept at 60° C. for about one hour and then evaporated to near dryness. The solids are now extracted repeatedly with distilled water. The liquid extract is charged to a separatory funnel and 300–400 ml. of saturated aqueous sodium carbonate is added. A precipitate forms upon shaking. One liter of diethyl ether is now added to the separatory funnel. Shaking dissolves the precipitate and results in two liquid layers. The ether layer is separated and evaporated to dryness and the aqueous layer set aside. Yellow solids remain which are about 99% 2,6-aldester. The solids are charged to a chromatography column filled with Florisil synthetic adsorbent and eluted with a 50:50 benzene-petroleum ether solution. The solvent is evaporated revealing snow-white crystals of 99+% 2,6-aldester. To be specific, the purity of the product was in excess of 99.99%. A neutron activation test analysis of the product showed no metals, except about 5 parts per million of zinc and a leser amount of chromium.

The aqueous layer is now evaporated to dryness. The yellowish crystals are 99% 2,6-dialdehyde. This can be further purified by the chromatographic process described above.

Example 2.—Transesterification

A one inch (outer diameter) polymerization tube equipped with a sidearm was charged with 0.006 g. manganous acetate tetrahydrate, $Mn(C_2H_3O_2)$ $4H_2O$, 10.8 g. ethylene glycol (9.6 ml.), 18.8 g. dimethyl-2,6-naphthalene dicarboxylate and .2 g. (1 wt. percent) 2-formyl-6-methylnaphthalene carboxylate. The tube was inserted to within five inches of the sidearm in a heated aluminum block maintained at 195–200° C. A stream of nitrogen (ca. 16 cc./min.) was passed through the melt by means of a capillary inserted to within one-quarter inch of the bottom of the tube. The effluent nitrogen was passed through a cold trap to remove the methanol; the methanol being collected in a graduated vessel for measurement. After the theoretical amount of methanol (6.6 ml. at 20° C.) had been collected, the temperature was raised to 210–220° C. for an additional 45 minutes.

Polymerization

The tube was removed from the heat and the capillary removed for the addition of 0.006 g. antimony trioxide. (Note: Care should be taken to expose the sample to the atmosphere as little as possible during this step.) The capillary was returned to the tube and the tube fully immersed in the block at 240° C. for 45 minutes while excess ethylene glycol distills into the trap. Only air cooling was used on the trap at this stage since low temperatures result in solidification of the distillate which plugs the lines. After this 45 minute period, most of the nitrogen flow was cut off, a vacuum was slowly applied via the sidearm, and the temperature raised to 265° C. The vacuum should be less than .15 mm. Hg within 30 minutes. The vacuum was maintained at 265° C. for 2½ hours. The vacuum was cut off, the capillary was raised above the surface of the polymer, and a slight pressure of nitrogen (5–10 p.s.i.) was admitted over the sample via the capillary. This pressure is maintained for 10 minutes to collapse the polymer to a solid plug. The tube was then removed from the block and allowed to cool at room temperature. (Occasionally the tube may shatter while cooling.) The tube is broken and any adhering glass is removed. The solid plug of polymer was broken up and ground by a Wiley mill (A. H. Thomas Co.) to pass a 20 mesh screen.

Solid state polymerization

The 20 mesh polymer (3–5 g.) was placed in a one inch diameter polymerization tube. A vacuum (less than 0.1 mm. Hg) was pulled on the tube and it was fully immersed in the heating block at 150° C. After 30 minutes the temperature was increased to 180° C. and after an additional 30 minutes the temperature was raised to 250° C. for 5 hours. Approximately every 45 minutes the tube was briefly removed from the block and jarred to be certain that the particles of polymer did not stick to one another. After the 5 hours at 250° C. the temperature was raised to 285° C. as quickly as possible and maintained there from 30 minutes to melt the polymer. The tube was removed from the heat and allowed to cool rapidly in the air, the vacuum being maintained. After 20 minutes the vacuum can be disconnected. The polymer at this time was non-crystalline and appeared to consist of fused particles. The tube is broken and any adhering glass is removed. The sample was again ground to pass a 20 mesh screen, and the inherent viscosity determined.

Inherent viscosity determination

The polymer (.0325+.0025 g.) was accurately weighed (±.001 g.) into a 10 ml. volumetric flask. The flask is filled to the index mark with a solution of 25% trifluoroacetic acid—75% methylene chloride (volume/volume). The flasks were allowed to stand at room temperature with occasional shaking until solution was complete (15–45 minutes). The solution was filtered through a Millipore filter to remove foreign particles while minimizing evaporation.

The efflux time in a Cannon-Fenske (size 50) viscometer was determined for both the solvent and the solution of polymer in the solvent. Due to volatility of the solvent, transfers are always made by pressure, not suction. The viscosity bath temperature is 100.0±.1° F. (37.8° C.).

Calculation:

$$\text{Relative viscosity } (\eta \text{ rel.}) = \frac{\text{efflux time solution}}{\text{efflux time solvent}}$$

$$\text{Inherent viscosity } (\eta \text{ inh.}) = \frac{\ln \eta \text{ rel.}}{C}$$

$C$ = concentration in grams/100 ml.

The inherent viscosity was determined to be 2.0. No crosslinking was evident.

Example 3

The process of Example 2 was repeated but with .2 g. (1 wt. percent) 2,6-diformyl naphthalene. This polymer was highly swollen (about 1000%) by the solvent but was not disolved therein, indicating light crosslinking.

Example 4

The process of Example 2 was repeated with the omission of the dialdehyde and the use of 20.0 g. of dimethyl-2,6-naphthalene dicarboxylate. The polymer had an inherent viscosity of 1.5.

The presence of the limited number of acetal linkages which result from the introduction of the dialdehydes and aldesters according to the invention do not cause any noticeable change or loss in the thermal properties of the polyesters.

The invention claimed is:

1. In the process of preparing polyesters from naphthalene-2,6-dicarboxylic acid or lower dialkyl esters thereof and a diol, the improvement which comprises adding to the reaction mixture a compound containing formyl groups and selected from the group consisting of 2,6-diformyl naphthalene, 2-formyl-6-alkyl naphthalene carboxylate and mixtures thereof, provided said compound is added in an amount that contains the number of formyl groups equivalent to that contained in the range of 0.005 to 2.5 wt. percent of 2,6-diformyl naphthalene.

2. The process according to claim 1 wherein the range is 0.005 to 1 wt. percent.

3. The process according to claim 1 wherein the alkyl portion of the esters have from 1 to 6 carbon atoms.

4. The process according to claim 3 wherein the alkyl portion of the 2-formyl-6-alkylnaphthalene carboxylate is the same as the dialkyl portion of naphthalene-2,6-dicarboxylic dialkyl esters.

5. The process according to claim 4 wherein the diol is selected from the group consisting of aliphatic, cyclic and aromatic having 2 to 8 carbon atoms.

6. The process according to claim 2 wherein the polyester is prepared from dimethyl-2,6-naphthalene dicarboxylate and an aliphatic diol having 2 to 8 carbon atoms to which is added a compound selected from the group consisting of 2,6-diformyl naphthalene, 2-formyl-6-methyl naphthalene carboxylate and mixtures thereof.

References Cited

UNITED STATES PATENTS 3,020,263   2/1962   Foster _____ 260—67
3,166,532   1/1965   Sweeny _____ 260—67

WILLIAM H. SHORT, *Primary Examiner.*

L. M. PHYNES, *Assistant Examiner.*

U.S. Cl. X.R.

260—67